(12) United States Patent
Suzuki

(10) Patent No.: US 6,344,836 B1
(45) Date of Patent: Feb. 5, 2002

(54) MULTIMEDIA INFORMATION SYSTEM

(75) Inventor: Hitoshi Suzuki, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/198,334

(22) Filed: Nov. 24, 1998

(30) Foreign Application Priority Data

Nov. 27, 1997 (JP) .............................. 9-325769

(51) Int. Cl.$^7$ ................................. G09G 5/00
(52) U.S. Cl. ...................... 345/2.1; 345/1.2; 345/158
(58) Field of Search ............................ 345/1, 2, 3, 112, 345/133, 158, 1.1, 1.2, 1.3, 2.1, 2.2, 2.3, 3.1, 3.2, 3.3, 3.4, 619, 440, 169

(56) References Cited

U.S. PATENT DOCUMENTS

| | | | | |
|---|---|---|---|---|
| 4,746,981 A | * | 5/1988 | Nadan et al. .................. | 345/1 |
| 4,800,376 A | * | 1/1989 | Suga et al. ..................... | 345/1 |
| 4,965,559 A | * | 10/1990 | Dye .............................. | 345/1 |
| 4,991,121 A | * | 2/1991 | Minoura et al. ................ | 345/1 |
| 5,523,769 A | * | 6/1996 | Lauer et al. .................... | 345/1 |

FOREIGN PATENT DOCUMENTS

| | | |
|---|---|---|
| JP | 6-282543 | 10/1994 |
| JP | 7-28619 | 1/1995 |

* cited by examiner

*Primary Examiner*—Xiao Wu
(74) *Attorney, Agent, or Firm*—Antonelli, Terry, Stout & Kraus, LLP

(57) ABSTRACT

An information browsing system has one system device and a plurality of displays connected to the system device by a general-purpose serial interface. Drawing data is transmitted through the general-purpose serial interface to the displays in a form of general-purpose serial interface so that different information is displayed on each of the displays.

16 Claims, 7 Drawing Sheets

MULTIMEDIA INFORMATION SYSTEM

BACKGROUND OF THE INVENTION

The present invention relates to information browsing techniques, and more particularly to an invention effective in applications to an information processing technique which is used in a variety of environments of social activity such as homes, enterprises and so forth and enables the browsing and listening to a variety of digital information.

In recent years, digitized information contents or information media as the following (1) to (6) made the object of browsing and listening in homes, enterprises and so forth are having been substantial with the progress of multimedia mainly including personal computers:

(1) video images, sounds, landscapes and so forth recorded by digital cameras or the like;

(2) images, musics, news, games, amusements and so forth provided by DVD's (digital video disks), Internet and so forth;

(3) electronic characters, aquariums, zoological gardens, art galleries, museums and libraries, virtual travels, and so forth;

(4) digital TV broadcasting, digital TV telephones, electronic mails and so forth;

(5) notices, guidances, commercials and so forth; and (6) selected information adjusted, edited/extracted from large amounts of information and important to individuals or enterprises.

It may be considered that in the future, a further variety of digital information will be provided and anyone will hope for the browsing and listening to them.

A digital information browsing system needs a computer technology such as a personal computer. An information provider system utilizing a computer network system includes, for example, a technique disclosed by JP-A-8-115337. In this prior art, the system is constructed by a server which stores and provides digital information such as desired multimedia event information and an electronic calendar which is mounted on a dedicated device with a computer such as a personal computer for home use or a display connected by a network. In response to the designation of a date or the like by the dedicated device, the corresponding event information is outputted.

A personal computer has primarily been improved as not a computer for passively processing information as in the watching and listening of TV broadcasting but a computer for personal use for enabling an active information processing as in the composition of a document. Therefore, a point of contact or interface between a personal computer and a user assumes an interactive operation in a form in which the user first designates a desired matter to a system and the system responds thereto. In such a user interface of the personal computer, a keyboard is indispensable for inputting characters and numerals and a mouse is indispensable for pointing an icon or button on a display screen.

SUMMARY OF THE INVENTION

An object of the present invention is to provide an information Drowsing system which is installed in a variety of environments such as homes, enterprises and so forth and enables the browsing and listening to a variety of digital information.

Another object of the present invention is to provide an information browsing system having an excellent operability with which anyone can operate the system.

A further object of the present invention is to provide an information browsing system having an excellent installability with which a display can be installed in a variety of locations.

A furthermore object of the present invention is to provide an information browsing system which enables the reduction in total cost and the improvement in management and control of the whole by connecting a plurality of displays to one system device.

A general recognition for an operation by a keyboard-and a mouse is such that the hearing of an explanation in a certain extent or the reading of a brief explanation does not necessarily enable anyone to perform the operation and training of a certain standard is required. On the other hand, a general recognition for the operation of a remote controller for receiving TV broadcasting is such that the hearing of an explanation in a certain extent or the reading of a brief explanation enables anyone to perform the operation. Also, a general recognition for the operation of a touch panel at the time of drawing of cash from a cash dispenser or the like is such that the hearing of an explanation in a certain extent or the reading of a brief explanation enables anyone to perform the operation.

Accordingly, the operation by the keyboard or the mouse in the existing personal computer has a drawback that it is not suitable for the purpose of enabling anyone to perform the operation. In a certain type of personal computer for home use, an operation by a remote controller as in the TV or an operation by a touch panel as in a cash dispenser is possible. In such a type of personal computer, however, the operation by the remote controller or the touch panel is merely an auxiliary feature and enables partial operation and the operation by the keyboard and the mouse is mainly used. Therefore, the keyboard and the mouse are indispensable. Accordingly, such a personal computer has a drawback that is not suitable for the purpose of enabling anyone to perform the operation. The above-mentioned prior art has neither the reference to such a problem n-or the suggestion for solution of the problem.

On the other hand, in order to enable anyone to browse and listen to the above-mentioned digital information by the installation in homes, enterprises or the like, it is very serviceable to separate a display from a system device body such as a personal computer and to utilize a liquid crystal display or plasma display technique or the like to contemplate the reduction in thickness and weight of the display so that the display can be installed at various locations, for example, as a wall mounting type. Thereby, the display can be installed at a variety of those locations distant from the system device which, for example, in a home, include the top of a desk as well as the wall surface of a room, the side surface of a refrigerator, and so forth. Also, in an enterprise, the display can e installed on the top of a desk as well as the wall surface of an office, a conference room, a reception room, a corridor or the like, a notice equipment in the precinct of an airport the structure of a department store, a manufacturing line, the outdoors or the like, and so forth.

Further, it is very serviceable to connect a plurality of such displays to one system device, thereby enabling the utilization for browsing and listening. As compared with the case where a plurality of sets each including one system device body and one display connected thereto are prepared, the connection of a plurality of displays to one system device has a merit that the total cost can be reduced, a merit that the control and management of the whole can easily be made collectively, and so forth. The above-mentioned prior art has no reference to these points.

In a certain type of portable personal computer, the elimination of a keyboard and a mouse for small size and light weight is substituted by the equipment with a touch panel and a pen so that characters can be inputted by use of a function of recognition of characters handwritten by the pen or an operation substituted for the mouse operation can be performed by a pen touch. In this type of personal computer, however, a system device and a display are united for portability. The unitary structure of the system device and the display has a drawback that in order to enable the installation at various locations, for example, as a wall mounting type, not only the display but also the system device body must be reduced in thickness and weight. Also, in the case where a plurality of displays are connected to one system device, it is very inconvenient unless a power supply switch for a personal computer body and a power supply switch for a display are individually provided. However, if the personal computer body and the display are unitary, there is a drawback that inconveniences may be caused from the individual provision of the power supply switches.

To the contrary, if the display and the system device are separated, the realization of reduction in thickness and weight of the display suffices for the installation at various locations, for example, as a wall mounting type. Further, in the case where a plurality of displays are connected to one system device, the individual provision of power supply switches is facilitated. Accordingly, the portable personal computer of the type having the unitary structure of a display and a system device has a drawback that it is not suitable for the purpose of installing the structure at various locations, for example, as a wall mounting type or connecting a plurality of displays to one system device so that anyone is enabled to browse and listen to digital information. The above-mentioned prior art has no reference to these points.

Also, in the above-mentioned type of personal computer in which an operation by a remote controller is possible, a receiver for the remote controller is mounted on not a display but a system device body. However, this structure is very inconvenient in the case where the display is placed at a location distant from the system device. To the contrary, if the receiver for the remote controller is mounted on the display, the operation by the remote controller while browsing and listening to digital information from the display becomes possible even if the display is placed at a location distant from the system device. Accordingly, the personal computer having the receiver for the remote controller mounted on the system device has a drawback that it is not suitable for the purpose of placing the display at a location distant from the system device so that anyone is enabled to browse and listen to digital information. The above-mentioned prior art has no reference to these points.

Thus, the above-mentioned prior art and the existing personal computer s have the drawback that they are not suitable for the main purpose of installing an information browsing system in a variety of environments such as homes, enterprises and so forth to enable anyone to browse and to listen the above-mentioned digital information.

In an information browsing system of the present invention which is installed in a variety of environments such as homes, enterprises and so forth and is used, for example, for the browsing and listening to a variety of digital information, there are attained the improvement in operability of enabling the operation by anyone, the improvement in installability of enabling the installation of a display at a variety of locations, and the reduction in total cost and the facilitation of the management and control of the whole by connecting a plurality of displays to one system device.

According to the present invention, there is provided an information browsing system comprising a system device, a plurality of displays at least one of which has an information input interface, and a general-purpose serial interface for connecting the system device and the displays.

In one specific embodiment, there is provided an information browsing system in which one system device and one or plural displays having an information input interface other than a keyboard and a mouse are connected. For example, at least one of the displays can be equipped with a receiver for a remote controller and/or a touch panel as the information input interface. As required, the display may be equipped with a speaker for output of audio information, a camera and microphone for taking-in of a video image and audio information of a display installing environment, and so forth.

According to an information browsing system of the present invention which is installed in a variety of environments such as homes, enterprises and so forth and is used, for example, for the browsing and listening of desired digital information, there are obtained effects that the improvement in operability of enabling the operation by anyone and the improvement in installability of enabling the installation of a display at a variety of locations are made and the reduction in total cost and the facilitation of the management and control of the whole is realized by connecting a plurality of displays to one system device.

DESCRIPTION OF THE PREFERRED EMBODIMENTS

Embodiments of the present invention will now be described in reference to the drawings.

Figure 1:
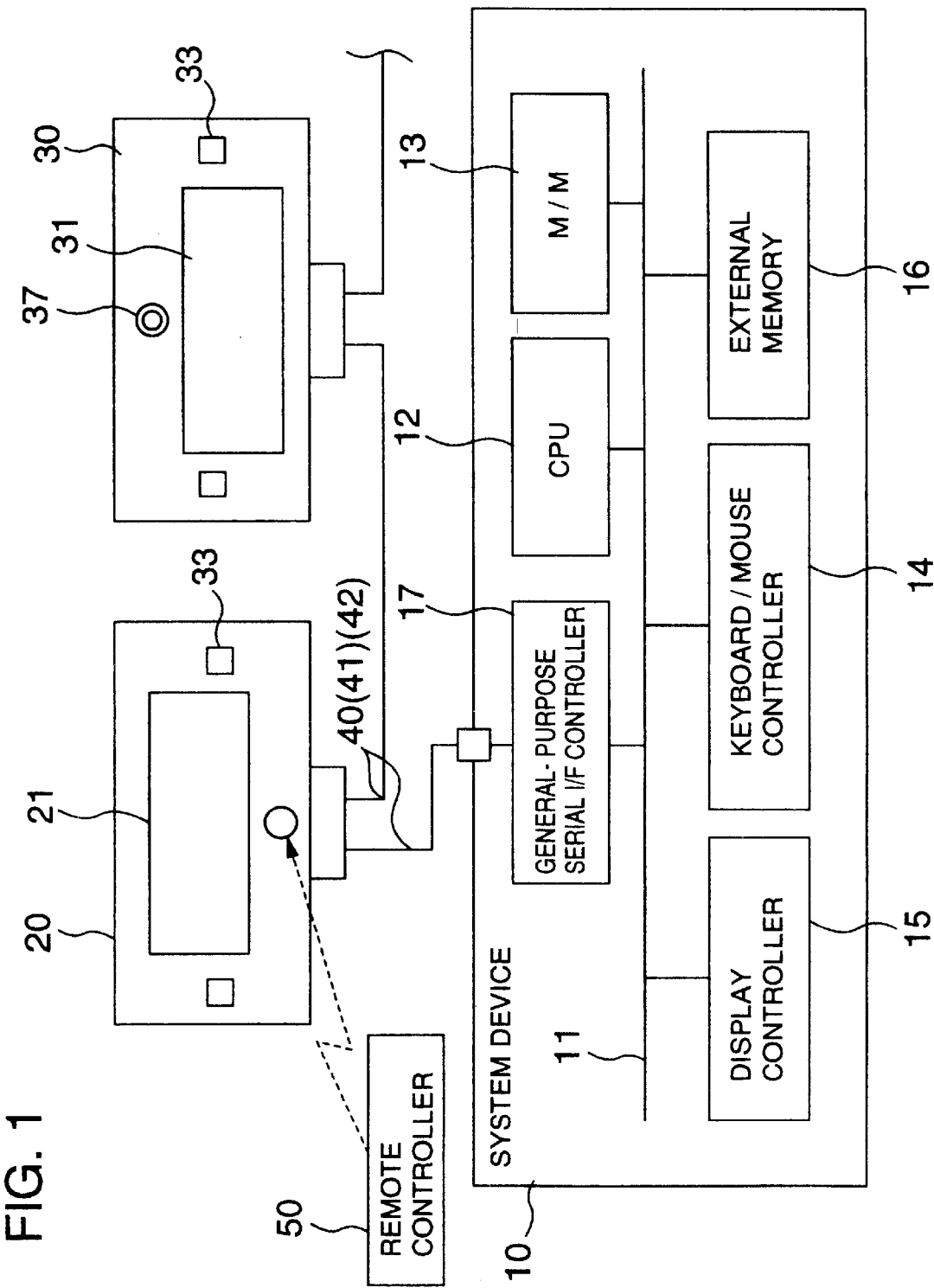
FIG. 1 is a conceptual diagram showing an example of the construction of an information browsing system according to an embodiment of the present invention.
Figure 2:
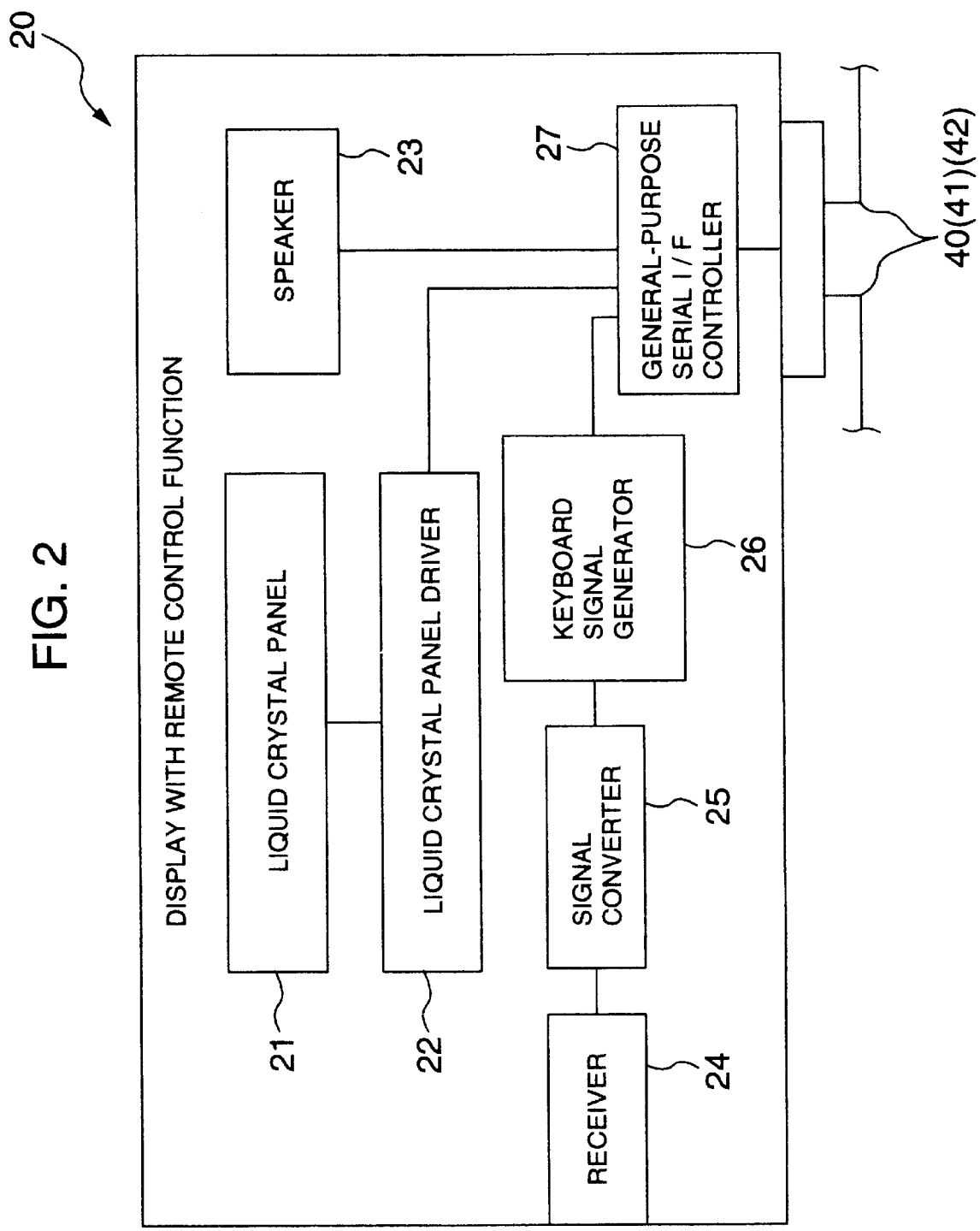
FIG. 2 is a block diagram showing an example of the construction of a display provided in the information browsing system of the embodiment.
Figure 3:
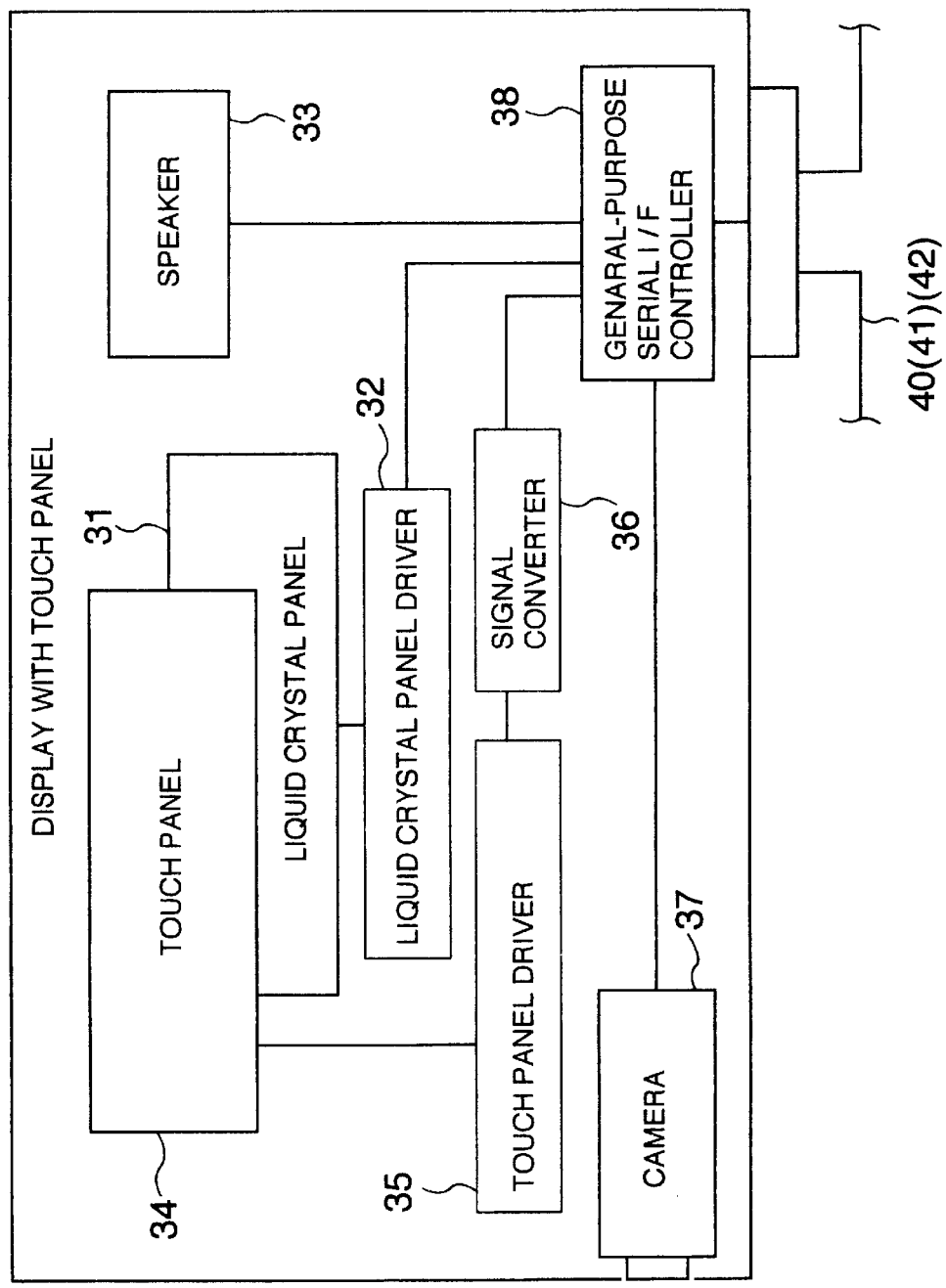
FIG. 3 is a block diagram showing an example of the construction of another display provided in the information browsing system of the embodiment.
Figure 4:
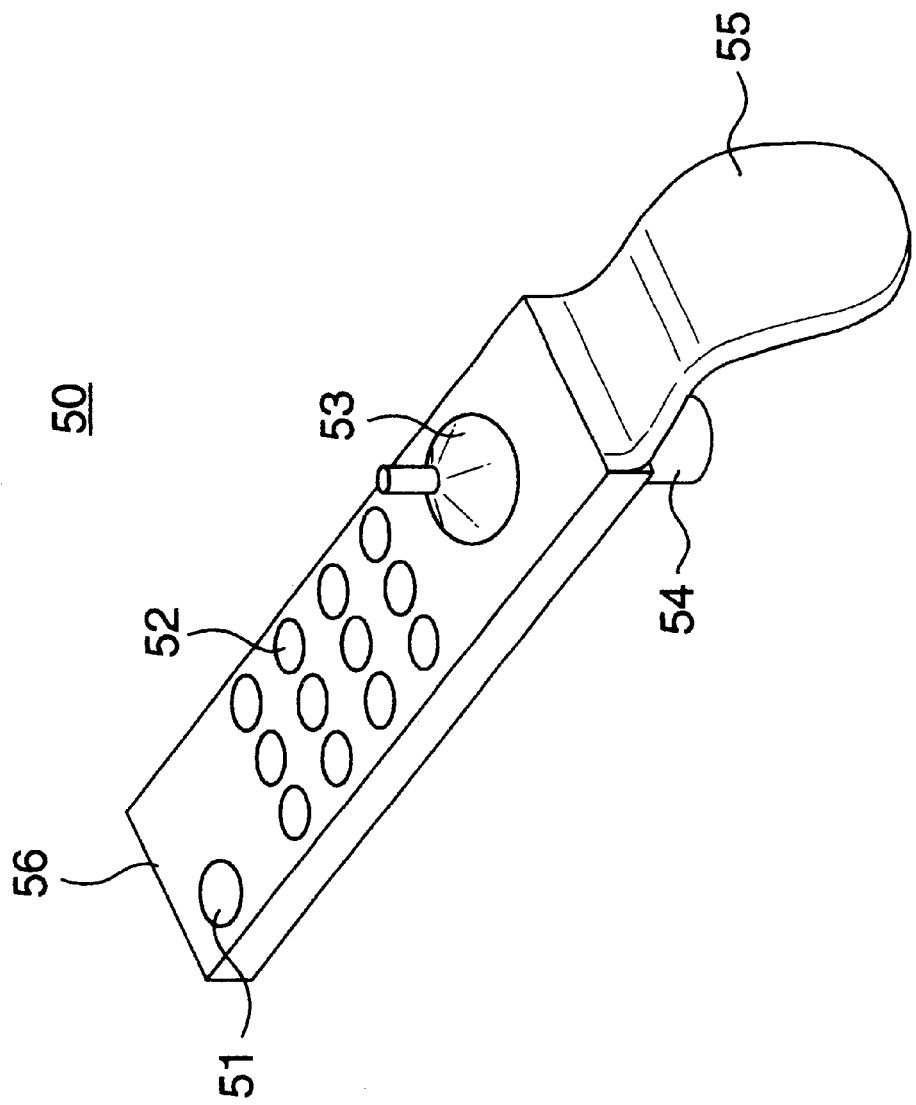
FIG. 4 is a perspective view showing an example of the construction of a remote controller provided in the information browsing system of the embodiment.

FIG. 1 is a conceptual diagram showing an example of the construction of an information browsing system according to an embodiment of the present invention. FIGS. 2 and 3 are block diagrams showing the examples of construction of displays provided in the information browsing system of the present embodiment. FIG. 4 is a perspective view showing an example of the construction of a remote controller provided in the information browsing-system of the present embodiment.

In the information browsing system of the present embodiment, a display 20 with remote control receiver (or a receiver for a remote controller) and a display 30 with touch panel are connected to a system device 10 through a general-purpose serial interface 40 for transmitting a display screen signal 41 and a keyboard/mouse signal 42. Also, there is provided a remote controller 50 which is used for inputting information to the display 20 with remote control receiver.

The system device 10 is a general personal computer, as shown by way of example in FIG. 1. The system device 10 is equipped with a CPU 12, a memory 13, a keyboard/mouse controller 14, a display controller 15, an external memory 16 such as a magnetic disk, CD-ROM or the like, a controller 17 for a general-purpose serial interface (I/F) such as a universal serial bus (USB) interface, for example, an IEEE 1394 interface in an international standard, and an extension bay, an extension slot, a power supply and so forth (not shown) through a system bus 11 and operates on the basis of an operating system such as Windows of Microsoft Inc. of U.S.A. which is resident in the memory 13. Also, the extension slot can be equipped with a modem with which the connection to the Internet or the like through a communication line becomes possible.

The display controller 15 of the system device 10 includes a video memory for holding drawing data to a display screen, a signal transceiver circuit. And BIOS and driver programs are needed for control thereof. Drawing data to be displayed on the display 20 with remote control receiver is held in a certain predetermined region of the video memory and drawing data to be displayed on the display 30 with touch panel is held in the same or another certain predetermined region of the video memory. If the display 20 with remote control receiver has a characteristic which includes, for example, 1024 pixels in horizontal direction and 768 pixels in vertical direction with each pixel having a 24-bit color (16,777,216 colors), the size of the drawing data to be displayed on the display 20 is 2,359,296 bytes (one byte=8 bits). Similarly, if the display 30 with touch panel has a characteristic which includes, for example, 1024 pixels in horizontal direction and 768 pixels in vertical direction with each pixel having a 24-bit color (16,777,216 colors), the size of the drawing data to be displayed on the display 30 is 2,359,296 bytes (one byte=8 bits). Also, the display controller 15 is provided with a function of controlling the output of audio information to a speaker on the display side, as required. In the case where audio information is outputted, an audio memory for holding audio data is additionally provided so that audio data to be outputted to the display 20 with remote control receiver is held in a certain predetermined region of the audio memory and audio data to be outputted to the display 30 with touch panel is held in the same or another certain predetermined region of the audio memory. By supplying respective drawing data to the display 20 with remote control receiver and the display 30 with touch panel through a display screen signal 41, video images are displayed on the respective display screens. By supplying respective audio data to the display 20 with remote control receiver and the display 30 with touch panel in a form superimposed on the display screen signal 41, the image display on the displays 20 and 30 and the audio output thereto are performed. Each of the display 20 with remote control receiver and the display 30 with touch panel is reduced in thickness and weight by use of a liquid crystal display, a plasma display or the like so that it can easily be installed on a wall surface or the like.

Also, the keyboard/mouse controller 14 of the system device 10 includes a signal transceiver circuit and receives keyboard/mouse signals 42 from the display 20 with remote control receiver and the display 30 with touch panel. And BIOS and driver programs are needed for control thereof. The signals are used for the control of an operating system on the system device 10.

When a USB interface, an IEEE1394 interface or the like is used as the interface for transmitting the display screen signal 41 and the keyboard/mouse signal 42, the wiring indoors can easily be performed. The display screen signal 41 on the system device 10 side including drawing data and audio data is once converted by the general-purpose serial I/F controller 17 into a format of general-purpose interface and is thereafter transferred to each display so that the image display and the audio output are made. Also, the keyboard/mouse signal 42 on the display 20 or 30 side including remote controller input data, touch panel input data and other input data is once converted by a general-purpose serial I/F controller 27 or 38 (see FIG. 2 or 3) into a format of general-purpose interface and is thereafter transferred to the system device 10 for the input of information.

As shown by way of example in FIG. 4, the remote controller 50 is equipped with a power supply switch button 51, numeral buttons 52, a small-size joy stick 53 having a function of moving a cursor, a function button 54 corresponding to a track ball or mouse button, a grip 55 grasped by an operator, a transmitter portion 56 for performing the transmission of information to the exterior by an infrared interface or the like, and so forth and performs a remote control operation for the display 20 with remote control receiver. Namely, it is possible to grasp the grip 55 by the right hand and to operate the small-size joy stick 53 by the thumb and the function button 54 by the forefinger. The power supply switch button 51 and the numeral button 52 can be operated by the left hand, as required.

As shown by way of example in FIG. 2, the display 20 with remote control receiver is equipped with a power supply switch (not shown), a liquid crystal panel 21 as an image display device, a liquid crystal panel driver 22, a speaker 23 for outputting audio information, a remote control receiver 24, a signal converter 25, a keyboard signal generator 26, and a general-purpose serial I/F controller 27 for controlling these components to perform the intermediation for the general-purpose serial interface 40.

The display 20 with remote control receiver receives an instruction from the remote controller 50 through the remote control receiver 24, converts it by the signal converter 25 and the keyboard signal generator 26 into a keyboard/mouse signal 42, and thereafter transmits the keyboard/mouse signal 42 to the keyboard/mouse controller 14 of the system device 10 through the general-purpose serial interface 40. In a general-purpose personal computer OS, a driver for converting an instruction from the remote controller 50 into a keyboard/mouse signal 42 has been put into practice. By utilizing this, an information input operation by the remote controller 50 can be realized without needing the development of special software. For example, when the numeral button 52 of the remote controller 50 is depressed, the conversion into a keyboard/mouse signal 42 equivalent to a signal indicating the depression of a numeral key of a keyboard is made. When the small-size joy stick 53 is operated, the conversion into a keyboard/mouse signal 42 equivalent to a signal indicating the operation of a mouse is made. When the function button 54 is depressed, the conversion into a keyboard/mouse signal 42 equivalent to a signal indicating the depression of a mouse button is made.

The liquid crystal panel driver 22 drives the liquid crystal panel 21 on the basis of a display screen signal 41 from the system device 10 through the general-purpose serial interface 40 so that the liquid crystal panel 21 outputs or displays video data.

As shown by way of example in FIG. 3, the display 30 with touch panel is equipped with a power supply switch (not shown), a liquid crystal panel 31 as an image display device, a liquid crystal panel driver 32, a speaker 33 for outputting audio information, a touch panel 34 provided uniting with the liquid crystal panel 31, a touch panel driver 35 for controlling the operation of the touch panel 34, a signal converter 36 for converting physical coordinate data outputted from the touch panel 34 into a logical coordinate value or the like such as arbitrary magnification or resolution, a CCD camera 37, and a general-purpose serial I/F controller 38 for controlling these components to perform the intermediation for the general-purpose serial interface 40.

An instruction based on the movement of a finger or pen touching the touch panel 34 is converted into a keyboard/mouse signal 42 through the signal converter 36 and is thereafter transmitted to the keyboard/mouse controller 14 of the system device 10. In a general purpose personal computer OS, a driver for converting, an instruction based on the movement of a finger or pen touching the touch panel, into a keyboard/mouse signal 42 has been put into practice. By utilizing this, an information input operation by the touch panel 34 can be realized without needing the development of special software. For example, when a finger or pen touches a certain position of the touch panel 34, the conversion into a keyboard/mouse signal 42 equivalent to a signal indicating the locating of a cursor at that position is made. When the touch panel is twice touched by a finger or pen, the conversion into a keyboard/mouse signal 42 equivalent to a signal indicating the depression of a mouse button is made.

Though not shown specifically, the display 20 with remote control receiver or the display 30 with touch panel may be provided with a microphone. Thereby, the input of voice is possible.

Next, description will be made of examples of application to the browsing and listening of digital information as the following (1) to (6) in homes, enterprises or the like:

(1) the looking and listening of video images, sounds, landscapes and so forth recorded by digital cameras or the like;

(2) the looking and listening of images, musics, news, games, amusements and so forth provided by DVD's, Internet and so forth;

(3) the looking and listening of electronic characters, aquariums, zoological gardens, art galleries, museums and libraries, virtual travels, and so forth;

(4) the looking and listening of digital TV broadcasting, digital TV telephones, electronic mails and so forth;

(5) the looking and listening of notices, guidances, commercials and so forth; and (6) the looking and listening of selected information edited/extracted from among many information and important to individuals or enterprises.

Figure 5:
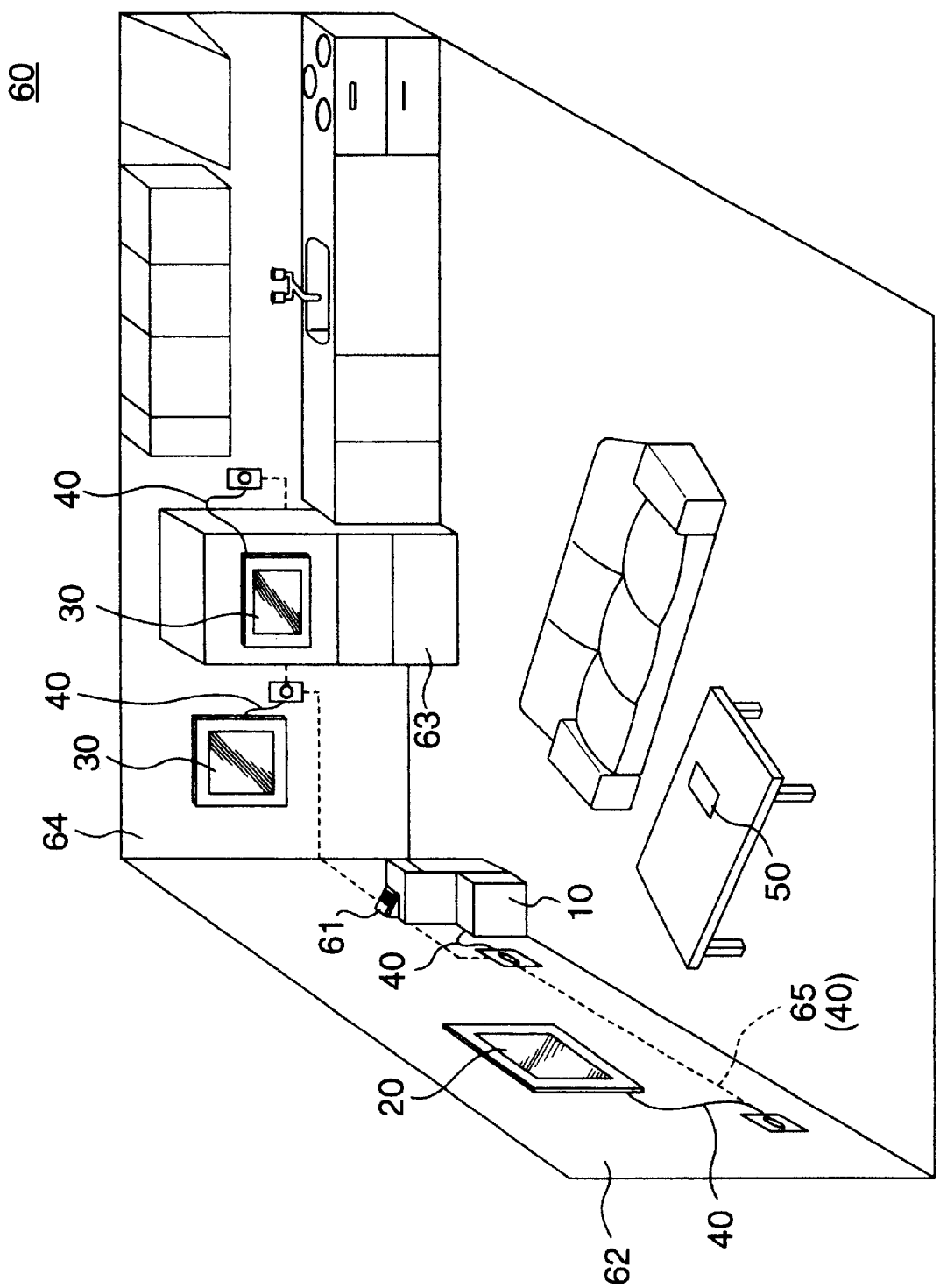
FIG. 5 is a conceptual view showing an example of application of the information browsing system of the embodiment in a home.

As the example of application in homes, consider the case where as shown by way of example in FIG. 5, a system device 10 is installed beside a telephone set 61 in a house 60, a display 20 with remote control receiver is installed on a wall surface 62 of a room, and displays 30 with touch panel are installed on a side surface of a refrigerator 63 and a wall surface 64 in the vicinity thereof. Each of the display 20 with remote control receiver and the display 30 with touch panel is reduced in thickness and weight by use of a liquid crystal display, a plasma display or the like so that it can easily be installed on the wall surface 62 or 64, the side surface of the refrigerator 63, or the like. The connection of the system device 10 with the display 20 with remote control receiver and the display 30 with touch panel can easily be wired indoors by use of a cable 65 of a USB interface, an IEEE1394 interface or the like.

The display 20 with remote control receiver is mounted on the wall surface 62 of the room, and the change-over of digital information and the turn-on/off of a power supply for the display 20 with remote control receiver are operated by a remote controller 50. As compared with a general desktop personal computer, this configuration is suitable, for the browsing and listening of the digital information of (1) to (6) with the sense of a personal TV, in that the installation on the top of a desk is not required and that the browsing and listening is possible in a sleeping posture without changing dress. Or, this configuration is suitable for the browsing and listening of the digital information of (1) to (3) and so forth as an atmosphere creating interior in a form mounted on the wall surface of a reception room.

The display 30 with touch panel is mounted on the side surface of the refrigerator 63, and the change-over of digital information is operated by an instruction based on the movement of a finger or pen. As compared with a general desktop personal computer, this configuration is suitable, for the browsing and listening of the digital information of (1) to (6) with the sense of a radio or white board, in that the installation on the top of a desk is not required and that the browsing and listening is possible while doing house-work.

Figure 6:
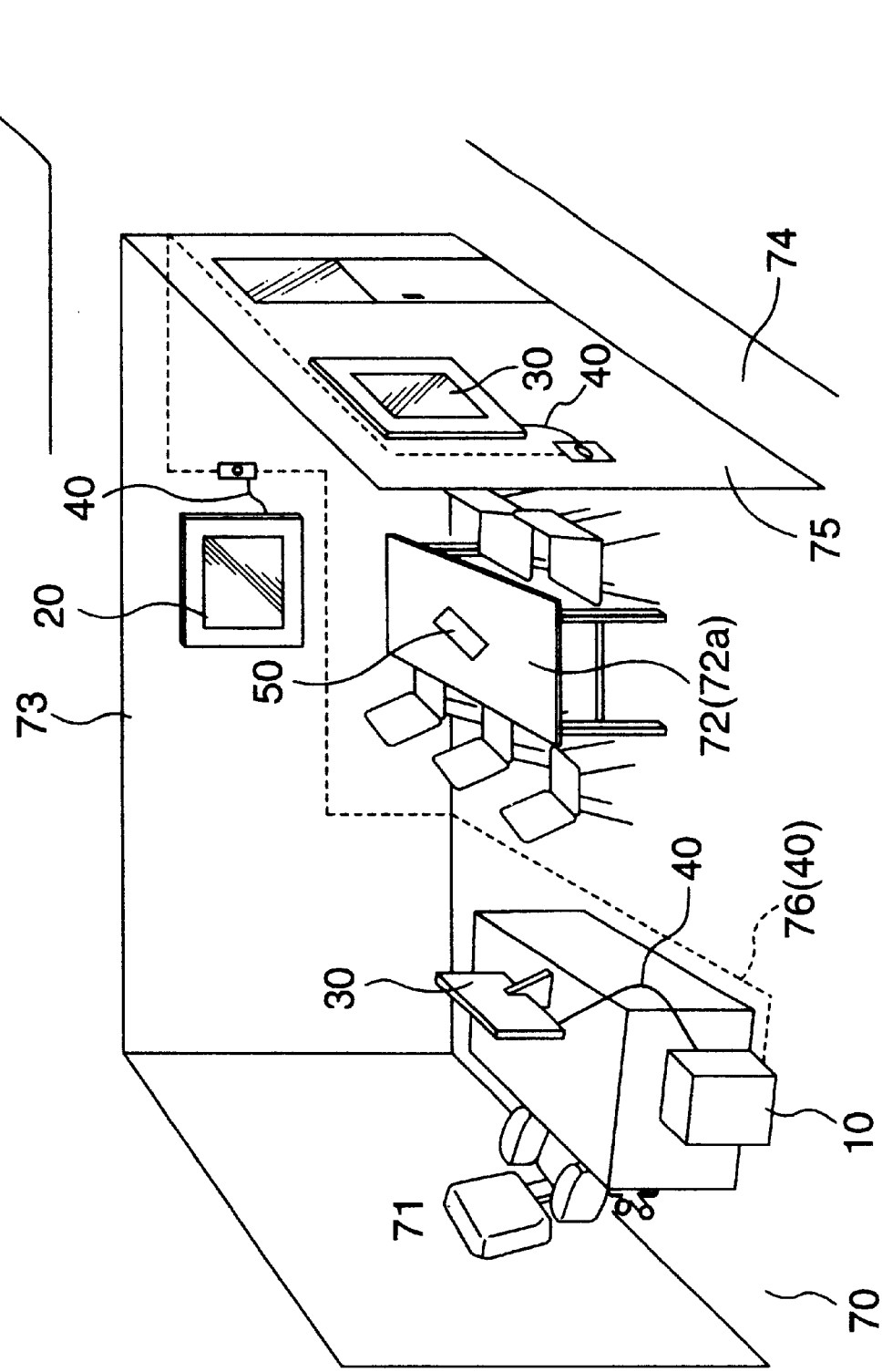
FIG. 6 is a conceptual view showing an example of application of the information browsing system of the embodiment in an enterprise.

Next, the example of application in enterprises or the like will be described referring to FIG. 6. In this example,—consider the case where a system device 10 and a display 30—with touch panel are installed beside an administrator's place 71 of an office room 70, a plurality of displays 20 with remote control receiver are installed on a wall surface 73 of a conference room 72, reception room 72a or the like, and a plurality of displays 30 with touch panel are installed on a wall surface 75 of a passage 74, outdoor notice equipment, or the like.

Each of the display 20 with remote control receiver and the display 30 with touch panel is reduced in thickness and weight by use of a liquid crystal display, a plasma display or the like so that it can easily be installed on the wall surface, notice equipment or the like. The connection of the system device 10 with the display 20 with remote control receiver and the display 30 with touch panel can easily be wired indoors by use of a cable 76 of a USB interface, an IEEE1394 interface or the like.

The display 20 with remote control receiver is mounted on the wall surface 73 of the conference room 72, and the change-over of digital information and the turn-on/off of a power supply for the display 20 with remote control receiver are operated by a remote controller 50. As compared with a general desktop personal computer, this configuration is suitable, for the browsing and listening to the digital information of (1), (2), (4), (6) and so forth, in-that the installation on the top of a desk is not required and that the browsing and listening is possible while making explanation or discussion. Or, this configuration is suitable for the browsing and listening to the digital information of (1), (2), (3), (5) and so forth as an atmosphere creating interior in a form mounted on the wall surface 73 of the conference room 72a or the like.

The display 30 with touch panel is installed on the wall surface 75 of the passage 74 or the like or an outdoor notice equipment or the like, and the change-over of digital information is operated by an instruction based on the movement of a finger or pen. As compared with a general desktop personal computer, this configuration is suitable, for the browsing and listening to the digital information of (1) to (6) with the sense of a notice board, in that the installation on the top of a desk is not required and the browsing and listening is possible while standing still in the course of passing.

Figure 7:
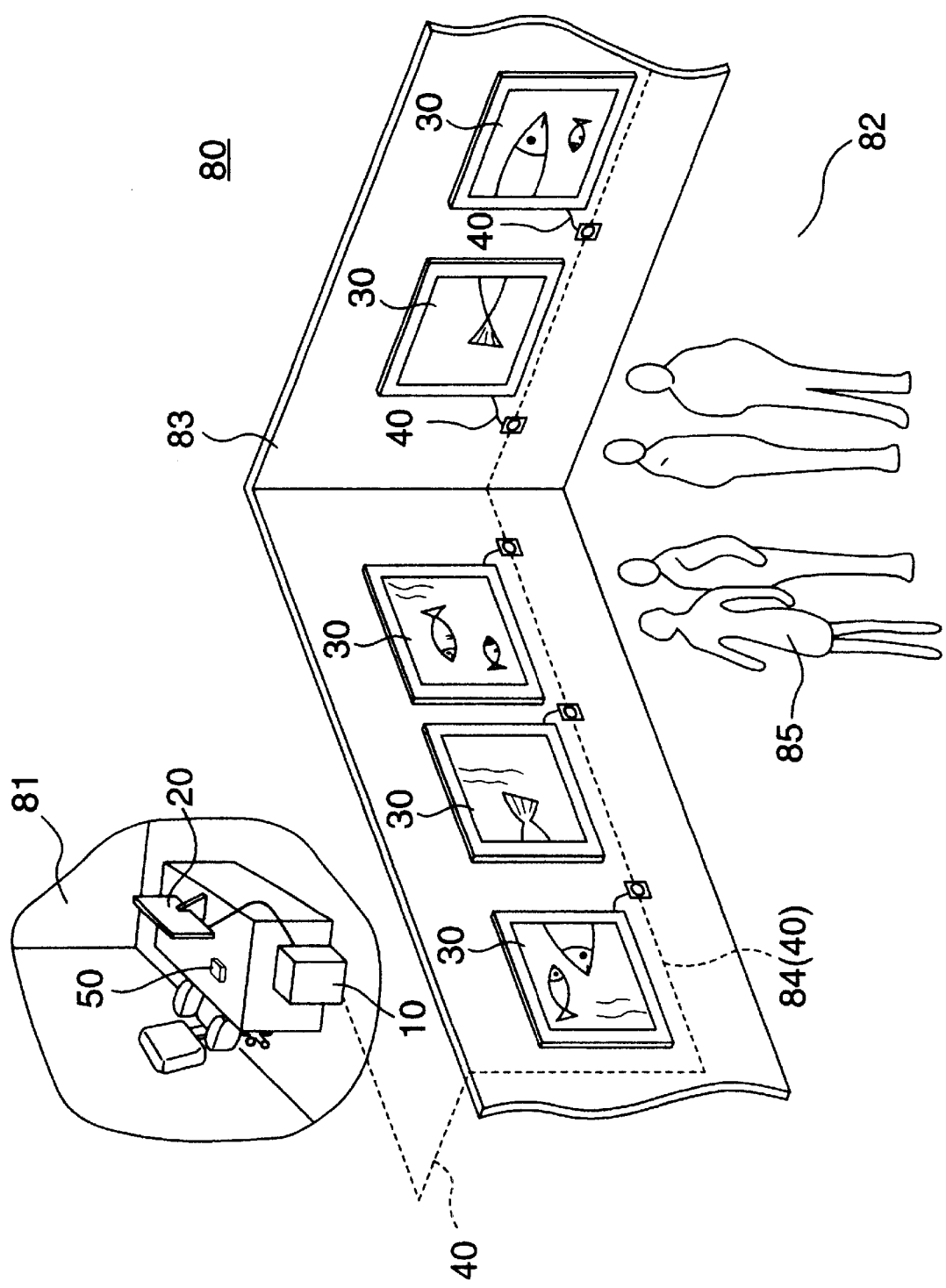
FIG. 7 is a conceptual view showing an example of application of the information browsing system of the embodiment to a recreational facility such as an electronic aquarium.

As another example of application, consider the case of an electronic aquarium 80 of FIG. 7 in which a system device 10 and a display 20 with remote control receiver are installed beside an administrator's place 81, and a plurality of displays 30 with touch panel are installed on a wall surface 83 of an inspection room 82 at constant intervals. The connection of the system device 10 with the display 20 with remote control receiver and the display 30 with touch panel can easily be wired in the wall surface of the structure by use-of a cable 84 of a USB interface, an IEEE1394 interface or the like.

An administrator operates the display 20 with remote control receiver at the administrator's place by a remote controller 50 to control the display conditions of the plurality of displays 30 installed on the wall surface 83 of the inspection room 82.

In this case, an application program of the system device 10 can be set so that it is as if there was a gigantic water tank on the other side of the wall surface 83 and the displays 30 with touch panel was being opened like peep-windows which gave a view of sailing fish and water plants. Also, the program can be set so that when a spectator 85 pokes his finger toward a sailing fish, the fish is forced to get near or to get away in surprise. Further, the program can be set so that one display 30 with touch panel gives a view of the front of a huge shark while the adjacent display 30 with touch panel gives a view-of the rear of the same shark, thereby displaying synchronous video images as if the huge shark crossed two peep-windows. In such a case, it is possible to make the best use of a merit that owing to the connection of a plurality of displays to one system device 10, the control and management of the whole can be performed collectively. If a video image of the front of the shark and a video image of the rear of the shark are controlled by separate system devices, a synchronous control at the precision on the order of several-tens milliseconds is required between those system devices, which brings about an increase in cost.

In the present embodiment as described above, the construction, in which one or more displays 20 with remote control receiver and displays 30 with touch panel equipped with no keyboard are connected to one system device 10, provides effects including the realization of structuring of a personal computer system having a main purpose of installing the system in homes, enterprises or the like to enable the browsing and listening to the above-mentioned digital information by anyone, that is, effects as enumerated in the following.

Namely, by eliminating operations based on a keyboard and a mouse and thereinstead employing an operation based on an operation by the remote controller 50 or an operation by the touch panel 34, the operation is facilitated.

By separating a display such as the display 20 with remote control receiver or the display 30 with touch panel from the system device 10, the display can be reduced in thickness and weight, thereby enabling the installation at various locations, for example, as a wall mounting type.

With the provision of the display 20 with remote control receiver remote-controlled by the remote controller 50, it becomes possible to install the display at a location distant from the system device 10, thereby improving the degree of freedom of installation of the display.

Since the management is made with a plurality of displays 20 with remote control receiver and displays 30 with touch panel or the like connected to one system device 10, there is a merit that a reduction in total cost is made and the control and management of the whole can easily be performed collectively.

Since each of the display 20 with remote control receiver and the display 30 with touch panel can be equipped with a speaker, a microphone and/or a CCD camera, a variety of information operations including the output of sounds, the input of sounds and/or the input of a video image are possible.

Also, there is an effect that the presentation to a use for the browsing and listening of the above-mentioned digital information of (1) to (3) and so forth is possible as an interior creating the atmosphere of an installing environment.

Though the present invention has specifically been described on the basis of the embodiment, it is needless to say that the invention is never limited to the disclosed embodiment and various changes/modifications can be made within a scope which does not depart from the gist of the invention.

As the display can be used a liquid crystal panel Dr the like as well as other thin display devices such as a plasma display. As the general-purpose serial interface can widely be used not only a USB interface and an IEEE1394 interface but also other general-purpose serial interfaces including a LAN (Local Area Network), a radio interface and so forth.

What is claimed is:

1. An information browsing system comprising:
   one system device, a drawing data storage device disposed within said system device or disposed external to said system device and connected to said system device, said drawing data storage device to store a plurality of drawing data therein;
   a plurality of displays spaced apart from each other, at least one of the plurality of displays comprising a remote control receiving and processing apparatus to receive commands from a remote controller spaced apart from said at least one of the plurality of displays and to process said received commands; and
   a general-purpose serial interface to connect said system device and said plurality of displays;
   wherein the drawing data is transmitted through said general-purpose serial interface to said plurality of displays in a format of said general-purpose serial interface to display different information on each of said plurality of displays.

2. The information browsing system of claim 1, wherein information displayed by at least two of said plurality of displays is coordinated.

3. The information browsing system of claim 1, wherein at least one of said plurality of displays comprises an information input interface to input information input data to be transmitted through said general-purpose serial interface to said system device in a format of said general-purpose serial interface.

4. The information browsing system of claim 1, wherein an electrical power source to said at least one of said plurality of displays is switched on and off in response to commands from said remote controller.

5. The information browsing system of claim 1, wherein a cursor displayed on said at least one of said plurality of displays is moved in response to commands from said remote controller.

6. The information browsing system of claim 1, wherein said remote control receiving and processing apparatus processes said received commands by converting said commands from said remote controller into a keyboard format signal.

7. The information browsing system of claim 1, further comprising at least one of a microphone or a video camera disposed adjacent at least one of said plurality of displays to transmit audio or video data to said one system device via said general-purpose serial interface.

8. The information browsing system of claim 3, further comprising at least one of a microphone or a video camera disposed adjacent at least one of said plurality of displays to transmit audio or video data to said one system device via said general-purpose serial interface.

9. The information browsing system of claim 1, further comprising a speaker disposed adjacent at least one of said plurality of displays to receive audio data via said general-purpose serial interface and to generate an audio output in response thereto.

10. The information browsing system of claim 3, further comprising a speaker disposed adjacent at least one of said plurality of displays to receive audio data via said general-purpose serial interface and to generate an audio output in response thereto.

11. An information browsing system comprising:
one system device, a drawing data storage device disposed within said system device or disposed external to said system device and connected to said system device, said drawing data storage device to store a plurality of drawing data therein;
a plurality of displays spaced apart from each other;
a general-purpose serial interface to connect said system device and said plurality of displays; and
an interface control apparatus disposed within at least one of said plurality of displays;
wherein the drawing data is transmitted through said general-purpose serial interface to said plurality of displays in a format of said general-purpose serial interface to display different information on each of said plurality of displays.

12. The information browsing system of claim 11, further comprising at least one of a microphone or a video camera disposed adjacent at least one of said plurality of displays to transmit audio or video data to said one system device via said general-purpose serial interface.

13. The information browsing system of claim 11, further comprising a speaker disposed adjacent at least one of said plurality of displays to receive audio data via said general-purpose serial interface and to generate an audio output in response thereto.

14. An information browsing system comprising:
one system device, a drawing data storage device disposed within said system device or disposed external to said system device and connected to said system device, said drawing data storage device to store a plurality of drawing data therein;
a plurality of displays spaced apart from each other, at least one of said plurality of displays comprising a touch panel to receive input commands; and
a general-purpose serial interface to connect said system device and said plurality of displays;
wherein the drawing data is transmitted through said general-purpose serial interface to said plurality of displays in a format of said general-purpose serial interface to display different information on each of said plurality of displays.

15. The information browsing system of claim 14, further comprising at least one of a microphone or a video camera disposed adjacent at least one of said plurality of displays to transmit audio or video data to said one system device via said general-purpose serial interface.

16. The information browsing system of claim 14, further comprising a speaker disposed adjacent at least one of said plurality of displays to receive audio data via said general-purpose serial interface and to generate an audio output in response thereto.

* * * * *